United States Patent
Teraue

(10) Patent No.: US 7,277,578 B2
(45) Date of Patent: Oct. 2, 2007

(54) IMAGE DATA OUTPUT APPARATUS AND IMAGE DATA OUTPUT PROGRAM STORAGE MEDIUM

(75) Inventor: Eiji Teraue, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 658 days.

(21) Appl. No.: 09/793,962

(22) Filed: Feb. 28, 2001

(65) Prior Publication Data

US 2001/0017716 A1 Aug. 30, 2001

(30) Foreign Application Priority Data

Feb. 29, 2000 (JP) .............................. 2000-053846

(51) Int. Cl.
*G06K 9/34* (2006.01)
*H04N 1/387* (2006.01)

(52) U.S. Cl. ........................ 382/173; 358/358; 358/450

(58) Field of Classification Search ................ 382/173, 382/284, 282; 358/450, 453
See application file for complete search history.

(56) References Cited

U.S. PATENT DOCUMENTS 5,128,776 A * 7/1992 Scorse et al. ............... 382/240
5,649,032 A * 7/1997 Burt et al. .................. 382/284
6,661,455 B1 * 12/2003 Toyofuku et al. ......... 348/231.6

FOREIGN PATENT DOCUMENTS

JP 11-284842 A 10/1999

* cited by examiner

*Primary Examiner*—Thomas D. Lee
(74) *Attorney, Agent, or Firm*—Sughrue Mion Pllc.

(57) ABSTRACT

In an image data output apparatus for outputting image data representative of a single image through a conversion into image data representative of partial images each to be recorded, when the single image is outputted on a divisional basis into a plurality of sheets, on the associated sheet, a partial image is designated in accordance with an operation, so that only the designated partial image is outputted.

19 Claims, 5 Drawing Sheets

IMAGE DATA OUTPUT APPARATUS AND IMAGE DATA OUTPUT PROGRAM STORAGE MEDIUM

BACKGROUND OF THE INVENTION

1. Field of the Invention

The present invention relates to an image data output apparatus for outputting image data representative of a single image through a conversion into image data representative of partial images each to be recorded, when the single image is outputted on a divisional basis into a plurality of sheets, on the associated sheet, and an image data output program storage medium storing an image data output program which causes a computer to operate as such an image data output apparatus when the image data output program is executed in the computer.

2. Description of the Related Art

Hitherto, it is performed that image data is taken into an image processing apparatus, which is realized using a personal computer and the like, so that an edition of an image is carried out on the image data, or a color correction is carried out, and image data subjected to the edition and the color correction is outputted to an image output apparatus such as a color printer so that the image output apparatus outputs a desired image.

When it is intended that an image output apparatus is used to output an image, it happens that a size of the edited image is too large to record the image in its entirety on a sheet of paper. In order to cope with such a situation, it happens that the image output apparatus side performs a so-called tiling output that image data of a single image is converted into image data representative of partial images to be recorded on segment papers when the single image is outputted on a divisional basis into a plurality of sheets of paper (for example, two sheets, four sheets, six sheets, etc.) according to a size of the image, and the plurality of sheets of paper, on which the partial images are recorded, are combined to form a sheet of image.

Hitherto, in the event that the tiling is performed, there is provided such an arrangement that a divisional number of sheets is automatically determined in view of a size of image, and image data representative of partial images the number of which is the same as the divisional number of sheets are sequentially continuously outputted to the image output apparatus. This arrangement is involved in a problem that it is hard to cope with an error, for example, a paper jam, which will occur on the way of the output. According to the conventional way, there is adopted such a scheme that the tiling output is again implemented, after the cause of the error is removed. However, according to such a scheme, for example, in the event that an error occurs on the fifth sheet or the sixth sheet on the way of printing on a divisional basis into six sheets for instance, the print output is performed from the first sheet. This is useless in time and also wasteful in use of sheets.

SUMMARY OF THE INVENTION

In view of the foregoing, it is an object of the present invention to provide an image data output apparatus capable of omitting useless in the tiling output, and an image data output program storage medium storing an image data output program which causes a computer to operate as such an image data output apparatus when the image data output program is executed in the computer.

To achieve the above-mentioned object, the present invention provides an image data output apparatus for outputting image data representative of a single image through a conversion into image data representative of partial images each to be recorded, when the single image is outputted on a divisional basis into a plurality of sheets, on the associated sheet, said image data output apparatus comprising:

a partial image designation section for designating a desired partial image of partial images to be outputted to the plurality of sheets in accordance with an operation, said partial images constituting the single image; and a data output section for outputting image data representative of the partial image designated by said partial image designation section, of the single image.

In the image data output apparatus according to the present invention as mentioned above, it is preferable that the image data output apparatus further comprises an area display section for specifying areas for a plurality of partial images to be outputted to the plurality of sheets and displaying an area for a single image in its entirety consisting of the plurality partial images, wherein said partial image designation section designates a desired area of the areas for the plurality partial images displayed by said area display section, in accordance with an operation, and thereby designating the desired partial image associated with the desired area.

To achieve the above-mentioned object, the present invention provides an image data output program storage medium storing an image data output program which causes a computer to operate as an image data output apparatus for outputting image data representative of a single image through a conversion into image data representative of partial images each to be recorded, when the single image is outputted on a divisional basis into a plurality of sheets, on the associated sheet, when the image data output program is executed in the computer, wherein said image data output program storage medium stores the image data output program comprising:

a partial image designation section for designating a desired partial image of partial images to be outputted to the plurality of sheets in accordance with an operation, said partial images constituting the single image; and a data output section for outputting image data representative of the partial image designated by said partial image designation section, of the single image.

In the image data output program storage medium according to the present invention as mentioned above, it is preferable that said image data output program further comprises an area display section for specifying areas for a plurality of partial images to be outputted to the plurality of sheets and displaying an area for a single image in its entirety consisting of the plurality partial images, and wherein said partial image designation section designates a desired area of the areas for the plurality partial images displayed by said area display section, in accordance with an operation, and thereby designating the desired partial image associated with the desired area.

According to the present invention, a partial image is designated in accordance with an operation, so that only the designated partial image is outputted. This feature makes it possible to prevent the useless in the image output. Further, to designate the partial image, the area display section is used to display an area for a single image in its entirety specifying areas for partial images to be outputted to a plurality of sheets. This feature makes it easy to designate the partial images to be outputted.

DETAILED DESCRIPTION OF PREFERRED EMBODIMENTS

Embodiments of the present invention will be described with reference to the accompanying drawings.

Figure 1:
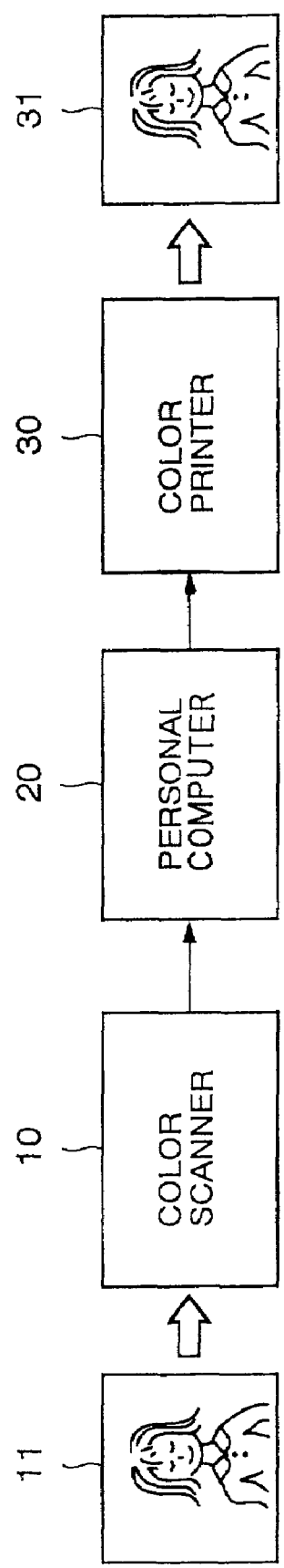
FIG. 1 is a schematic constitution view of an image input-color conversion-image output system.

FIG. 1 is a schematic constitution view of an image input-color conversion-image output system.

A color scanner 10 reads an original image 11 and produces image data of three colors consisting of C (cyan), M (magenta), and Y (yellow). The image data of the CMY three colors is fed to a personal computer 20. The personal computer 20 converts the image data obtained by the color scanner 10 into image data for an image output suitable for a color printer 30 which will be described later. The image data for the image output is fed to the color printer 30. The color printer 30 performs a print output in accordance with the entered image data so that a print image 31 is formed.

In the system shown in FIG. 1, while the color printer 30 is shown as an example of an output device for outputting an image based on the image data, any one is acceptable, as the output device, which is a color printer according to an electrophotographic scheme, a color printer according to an ink jet scheme, or a printer according to a system in which a printing paper is exposed with a modulated laser beam and the exposed printing paper is developed, and it doesn't matter as to the printing scheme and the printing system. Further, as the image output device, it is not restricted to a printer, and any one is acceptable which is a printing machine, or alternatively an image display device such as a CRT display unit for displaying an image on a display screen, and a plasma display unit.

Here, however, there will be described a system having the color printer 30 by way of example of the output device.

An aspect as an embodiment of the present invention in the system shown in FIG. 1 resides in processing contents to be executed inside the personal computer 20. Hereinafter, there will be described the personal computer 20.

Figure 2:
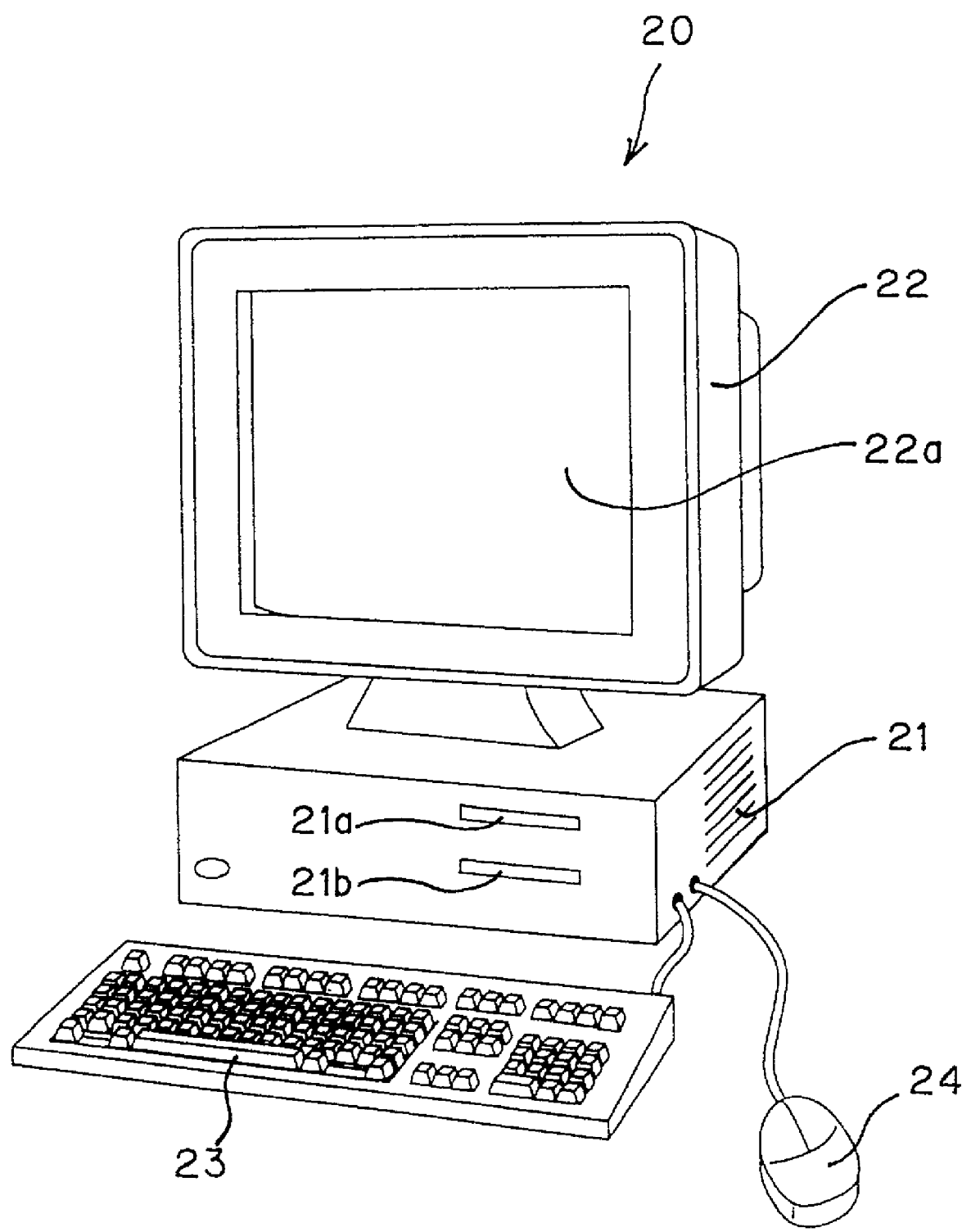
FIG. 2 is a perspective view of a personal computer shown in FIG. 1.
Figure 3:
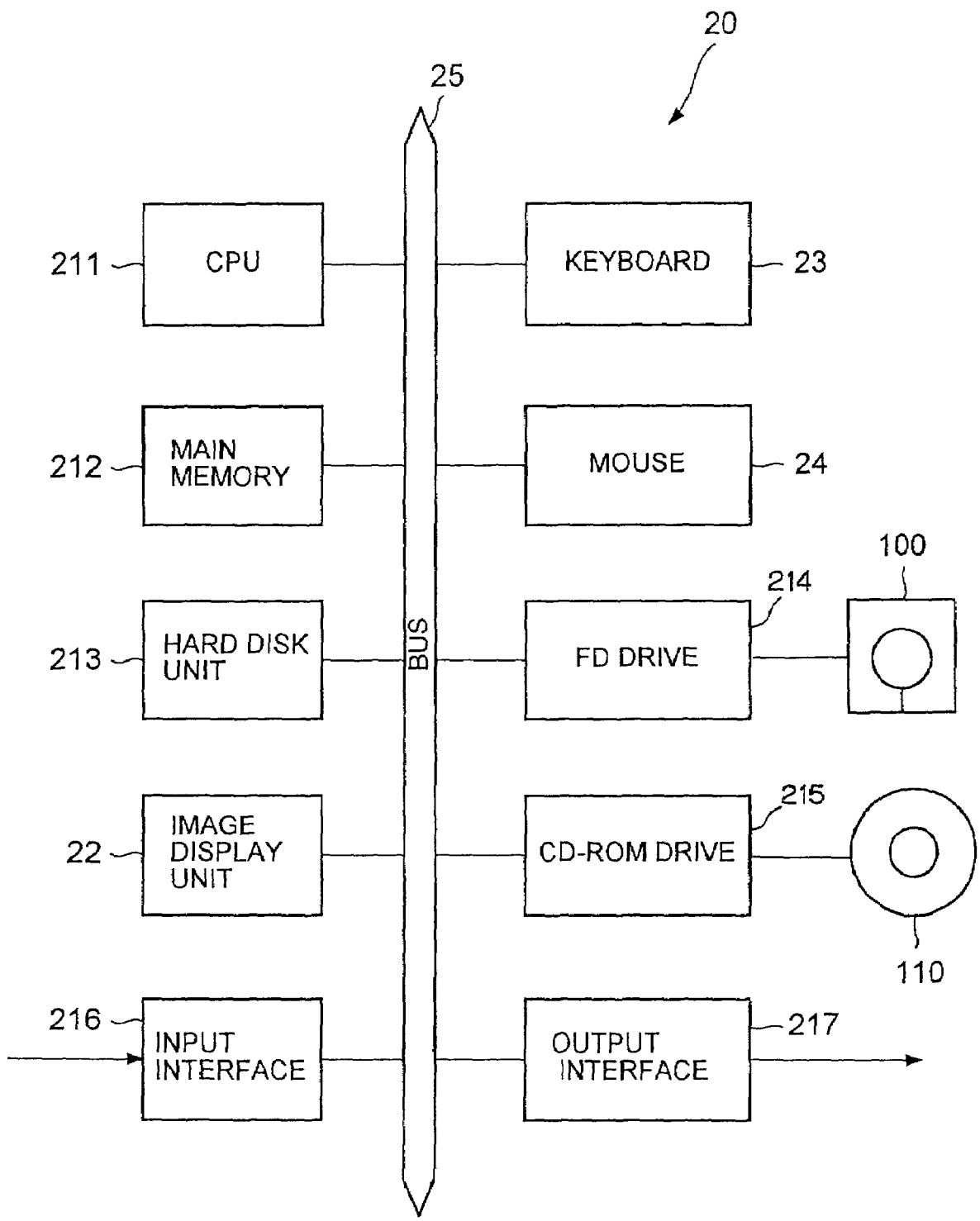
FIG. 3 is a hardware structural view of the personal computer.

FIG. 2 is a perspective view of the personal computer 20 shown in FIG. 1. FIG. 3 is a hardware structural view of the personal computer 20.

The personal computer 20 comprises, on an external appearance, a main frame unit 21, an image display unit 22 for displaying an image on a display screen 22a in accordance with an instruction from the main frame unit 21, a keyboard 23 for inputting various sorts of information to the main frame unit 21 in accordance with a key operation, and a mouse 24 for inputting an instruction according to, for example, an icon and the like, through designation of an optional position on the display screen 22a, the icon and the like being displayed on the position on the display screen 22a. The main frame unit 21 has a floppy disk mounting slot 21a for mounting a floppy disk, and a CD-ROM mounting slot 21b for mounting a CD-ROM.

The main frame unit 21 comprises, as shown in FIG. 3, a CPU 211 for executing a various types of program, a main memory 212 in which a program stored in a hard disk unit 213 is read out and developed for execution by the CPU 211, the hard disk unit 213 for saving various types of programs and data, an FD drive 214 for accessing a floppy disk 100 mounted thereon, a CD-ROM drive 215 for accessing a CD-ROM 110 mounted thereon, an input interface 216 connected to the color scanner 10 (cf. FIG. 1), to receive image data from the color scanner 10, and an output interface 217 to transmit image data to the color printer 30. These various types of elements are connected via a bus 25 to the image display unit 22, the keyboard 23 and the mouse 24.

The CD-ROM 110 stores therein an image data output program for causing the personal computer 20 to operate as an image data output apparatus. The CD-ROM 110 is mounted on the CD-ROM drive 215 so that the program, which is stored in the CD-ROM 110, is up-loaded on the personal computer 20 and is stored in the hard disk unit 213.

Figure 4:
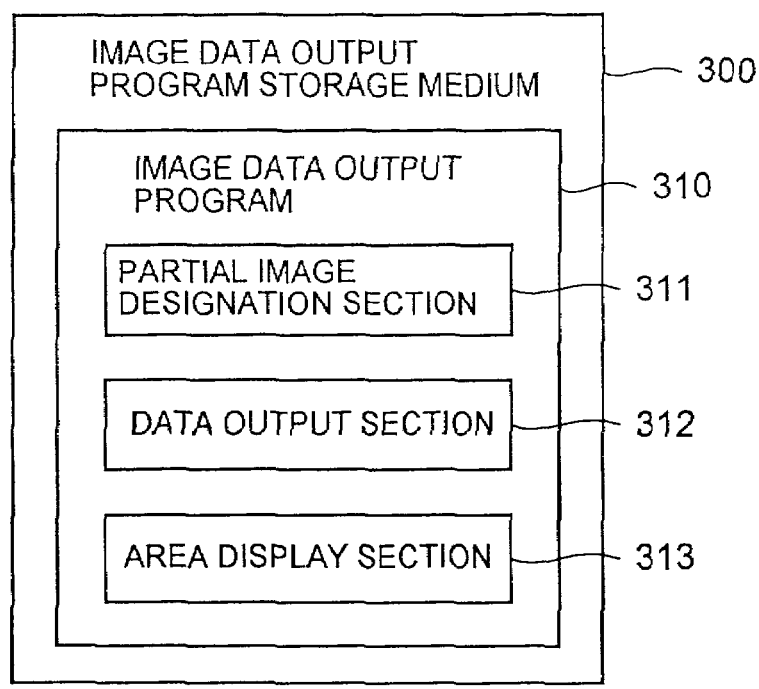
FIG. 4 is a view showing an embodiment of an image data output program storage medium of the present invention.

FIG. 4 is a view showing an embodiment of an image data output program storage medium of the present invention. This image data output program storage medium is typical of the storage medium of the CD-ROM 110 and hard disks in the hard disk unit 213 shown in FIG. 3.

An image data output program storage medium 300 stores therein an image data output program 310 having a partial image designating section 311, a data output section 312 and an area display section 313. Contents of the partial image designating section 311, the data output section 312 and the area display section 313 will be described later.

Figure 5:
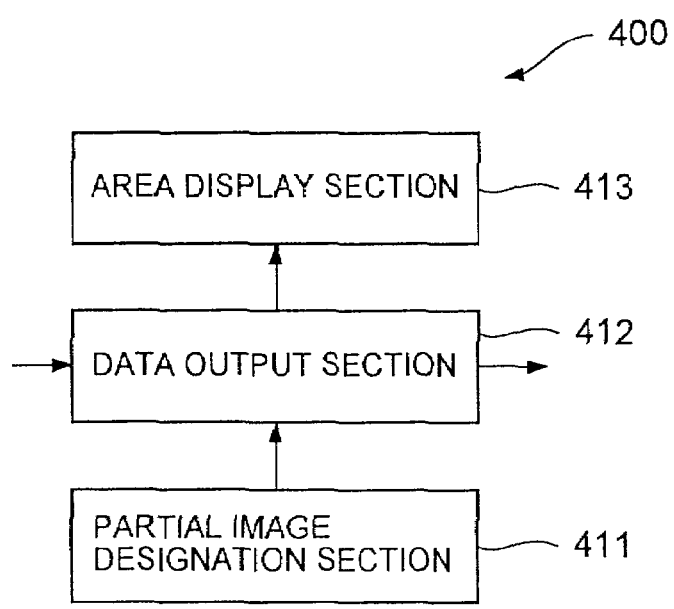
FIG. 5 is a functional block diagram showing an embodiment of an image data output apparatus of the present invention.

FIG. 5 is a functional block diagram showing an embodiment of an image data output apparatus of the present invention.

An image data output apparatus 400 is implemented in such a way that the image data output program 310 stored in the image data output program storage medium 300 shown in FIG. 4 is loaded on the personal computer 20 shown in FIGS. 1 to 3, and the image data output program 310 is executed in the personal computer 20.

The image data output apparatus 400 comprises a partial image designating section 411, a data output section 412 and an area display section 413. The partial image designating section 411, the data output section 412 and the area display section 413 are constructed by combinations of the partial image designating section 311, the data output section 312 and the area display section 313 as the soft ware parts shown in FIG. 4, and the hard wares of the personal computer 20 and OS (operation system), which are necessary for implementing the functions of those soft ware parts, respectively.

Hereinafter, there will be described the present embodiment.

The area display section 413 indicates areas for partial images to be outputted onto a plurality of segment papers, which constitute a single image intended to be subjected to a tiling output, on the display screen 22a of the image display unit 22 shown in FIG. 2, and displays an area for the single image in its entirety. At that time, it is preferable that the outline of the image is displayed in the area together the area.

The partial image designating section 411 designates a desired partial image of the partial images to be outputted onto a plurality of segment papers, which constitute a single image, in accordance with an operator's operation of the keyboard 23 or the mouse 24 of the personal computer 20 shown in FIG. 2. According to the present embodiment, a partial image intended to be outputted is designated by the operator while looking the area for the complete image and the areas for the partial areas displayed on the display screen. According to the present embodiment, it is also possible to designate the complete image on a batch basis, but not to designate the partial images one by one.

The data output section 412 is one in which image data representative of an image is inputted, the inputted image is converted into image datum representative of partial images recorded on segment papers when the single image represented by the image data is outputted on a divisional basis into a plurality of segment papers, and the image datum representative of the partial images designated by the partial image designating section 411 are outputted to color printer 30 shown in FIG. 1.

Figure 6:
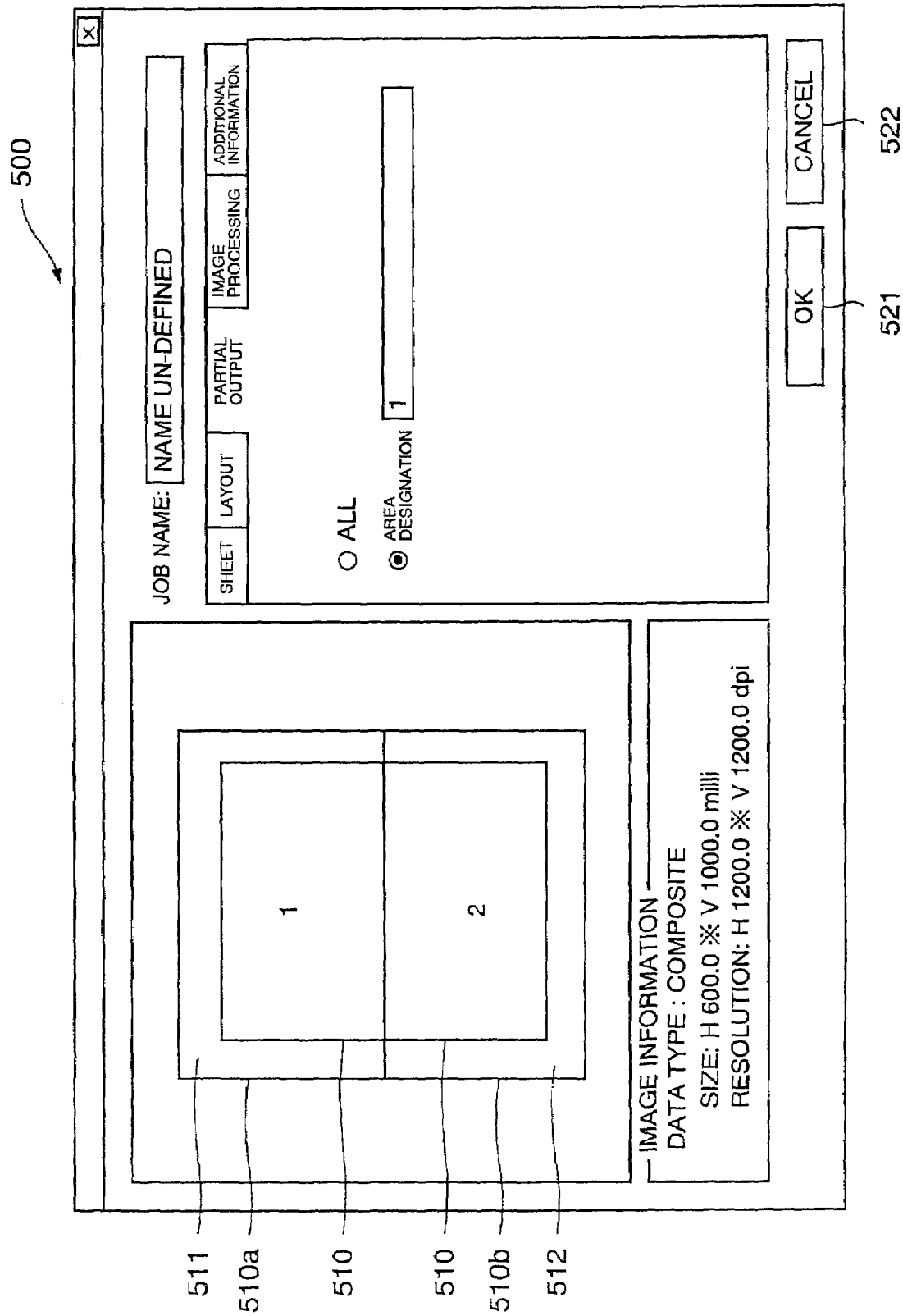
FIG. 6 is a view of an output designation screen for designating a divided area to be outputted.

FIG. 6 is a view of an output designation screen for designating a divided area to be outputted.

When a predetermined operation is performed through an operation of the keyboard 23 or the mouse 24 of the personal computer 20 shown in FIG. 2, an output designation screen 500 shown in FIG. 6 is displayed.

On the upper left of the output designation screen 500, there are shown an area 510 for a complete image and areas 511 and 512 for a plurality of sheets (here, two sheets). According to the present embodiment, an indication of areas for sheets specifies areas 510a and 510b for partial images partitioned by divisional lines between segment sheets. Numbers for specifying the partial images (here, two partial images are given, and thus '1' and '2') are applied to the partial images.

On the lower left of the output designation screen 500, there are displayed information involved in an image to be outputted.

On the right hand of the output designation screen 500, there are displayed "all" and "area designation" as the output range. When the "all" is selected through the mouse operation, and then an OK button 521 appearing on the lower right is clicked, the tiling output is performed on the area in its entirety.

On the other hand, when the "area designation" is selected through the mouse operation, the number (for example, '1') to specify an area to be outputted is inputted, so that an area for a sheet including an area for the designated partial image is displayed with a thick frame. In this situation, when the OK button 521 is clicked, only the image data representative of the partial image associated with the designated area is transmitted to the color printer 30 (cf. FIG. 1), so that the color printer 30 prints out only the partial image.

A cancel button 522 is a button for closing the output designation screen 500.

Incidentally, in the output designation screen 500 shown in FIG. 6, only the areas (frames) for the complete image and the partial images, and the image is not displayed per se. It is acceptable that the image is displayed per se.

Thus, according to the present embodiment, it is possible to output only the necessary partial images, and thereby omitting the useless.

Incidentally, according to the present embodiment, there is provided such an arrangement that even in a case where the complete image is outputted, the same screen as that for a designation for partial images is opened for a designation. However, it is acceptable that as far as it is not particularly designated, usually the tiling output is performed on an image in its entirety, and only in a case where it is particularly designated, for example, in a situation that an error occurs, only the designated partial image is outputted.

As mentioned above, according to the present invention, it is possible to omit the useless in the event that a single image is outputted on a divisional basis that the image is divided into a plurality of sheets.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An image data output apparatus for outputting image data representative of a single image through a conversion into image data representative of partial images each to be recorded, when the single image is outputted on a divisional basis into a plurality of sheets, on the associated sheet, in a tiling operation of the single image, said image data output apparatus comprising:

a partial image designation section for designating a desired partial image of partial images, said partial images to be outputted to the plurality of sheets in accordance with the tiling operation and said partial images constituting the single image; and a data output section for outputting image data representative of the partial image designated by said partial image designation section, of the single image, wherein each of the partial images correspond to a sheet size of a print medium.

2. An image data output apparatus according to claim 1, further comprising:

an area display section for specifying areas for a plurality of partial images to be outputted to the plurality of sheets and displaying an area for a single image in its entirety consisting of the plurality of partial images, wherein said partial image designation section designates a desired area of the areas for the plurality of partial images displayed by said area display section, in accordance with an operation, and thereby designating the desired partial image associated with the desired area.

3. An image data output apparatus according to claim 1, wherein the data output section is a printer.

4. An image data output apparatus according to claim 1, wherein the data output section is an output interface transmitting print data of the image data representative of the partial image.

5. An image data output apparatus according to claim 1, wherein each of the partial images are outputted at a first scale and the data output section outputs the desired partial image at the first scale.

6. An image data apparatus according to claim 1, wherein the data output section only outputs the image data representative of the partial image when only the partial image is designated by the partial image designation section.

7. An image data apparatus according to claim 1, wherein the partial image designation section displays a designation screen simultaneously displaying a first section and a second section, the first section displaying the entire single image divided into the partial images and the second section displaying a graphics user interface for designating one of the partial images for outputting.

8. An image data output program storage medium storing an image data output program which causes a computer to operate as an image data output apparatus for outputting image data representative of a single image through a conversion into image data representative of partial images each to be recorded, when the single image is outputted on a divisional basis into a plurality of sheets, on the associated sheet, in a tiling operation of the single image, when the image data output program is executed in the computer, wherein said image data output program storage medium stores the image data output program comprising:
- a partial image designation section for designating a desired partial image of partial images, said partial images to be outputted to the plurality of sheets in accordance with the tiling operation and said partial images constituting the single image; and
- a data output section for outputting image data representative of the partial image designated by said partial image designation section, of the single image,
- wherein each of the partial images correspond to a sheet size of a print medium.

9. An image data output program storage medium according to claim 8, wherein said image data output program further comprises an area display section for specifying areas for a plurality of partial images to be outputted to the plurality of sheets and displaying an area for a single image in its entirety consisting of the plurality of partial images, and
- wherein said partial image designation section designates a desired area of the areas for the plurality of partial images displayed by said area display section, in accordance with an operation, and thereby designating the desired partial image associated with the desired area.

10. An image data output program storage medium according to claim 8, wherein the data output section is a printer.

11. An image data output program storage medium according to claim 8, wherein the data output section is an output interface transmitting print data of the image data representative of the partial image.

12. An image data output program storage medium according to claim 8, wherein each of the partial images are outputted at a first scale and the data output section outputs the desired partial image at the first scale.

13. An image data output program storage medium according to claim 8, wherein the data output section only outputs the image data representative of the partial image when only the partial image is designated by the partial image designation section.

14. An image data output program storage medium according to claim 8, wherein the partial image designation section displays a designation screen simultaneously displaying a first section and a second section, the first section displaying the entire single image divided into the partial images and the second section displaying a graphics user interface for designating one of the partial images for outputting.

15. A method for printing comprising:
- converting a single image into a plurality of partial images for tiling output;
- designating one of the plurality of partial images as a designated partial image;
- outputting print image data of the designated partial image; and
- printing the designated partial image using the print image data,
- wherein each of the plurality of partial images correspond to a sheet size of a print medium.

16. A method for printing according to claim 15, wherein the printing the designated partial image using the print image data comprises printing the designated partial image on the print medium.

17. A method for printing according to claim 15, wherein each of the plurality of partial images are outputted at a first scale and the outputting print image data outputs the designated partial image at the first scale.

18. A method for printing according to claim 15, wherein the printing the designated partial image prints only the designated partial image.

19. A method for printing according to claim 15, wherein the designating one of the plurality of partial images comprises:
- displaying a designation screen simultaneously displaying a first section and a second section, the first section displaying the entire single image divided into the partial images and the second section displaying a graphics user interface for designating one of the partial images for outputting.

* * * * *